United States Patent [19]

Brushenko

[11] 3,999,845
[45] Dec. 28, 1976

[54] MECHANICAL SOUND REPRODUCING MEANS FOR AN AUDIO-VISUAL DEVICE

[75] Inventor: Anatoli Brushenko, Elmhurst, Ill.

[73] Assignee: GAF Corporation, New York, N.Y.

[22] Filed: June 5, 1974

[21] Appl. No.: 476,733

[52] U.S. Cl. .................................. 353/19; 274/1 A; 274/9 R; 274/23 R
[51] Int. Cl.² ................... G11B 25/04; G03B 31/06
[58] Field of Search ............... 274/1 A, 9 R, 23 R; 353/16, 17, 18, 19; 350/134; 40/28.1

[56] References Cited

UNITED STATES PATENTS

| | | | |
|---|---|---|---|
| 3,466,050 | 9/1969 | Sindlinger | 274/1 A |
| 3,484,160 | 12/1969 | Glass et al. | 353/19 |
| 3,589,735 | 6/1971 | Watanabe | 274/1 A |
| 3,664,673 | 5/1972 | Weiss et al. | 274/1 A |
| 3,667,765 | 6/1972 | Watanabe | 274/1 A |
| 3,782,732 | 1/1974 | Summerfield | 274/1 A |

Primary Examiner—Steven L. Stephan
Attorney, Agent, or Firm—Walter C. Kehm; Arthur Dresner

[57] ABSTRACT

A tone-arm generally in the form of a unitary right-angle member has first and second arms extending at approximately 90° to each other. A needle is supported by one of the arms, the other arm being connected to a stem which is in turn connected to the speaker diaphram for vibrating the latter when the tone-arm is vibrated in its own plane as a consequence of the needle engaging the grooves of a phonograph record. A fulcrum supports the tone-arm for pivoting movement in its own plane; this fulcrum also permits the arm supporting the needle to move in a second plane parallel with the record. Spring means hold the tone-arm in engagement with the fulcrum and at the same time maintain the needle in engagement with the record. A camming means operated by advancing mechanism for a transparency holder separates the needle from the record during indexing of the needle to the separate successive messages on the record. The speaker diaphram is supported by special mounting means to permit large bodily movements of the diaphram occasioned by separation of the needle from the record.

14 Claims, 13 Drawing Figures

MECHANICAL SOUND REPRODUCING MEANS FOR AN AUDIO-VISUAL DEVICE

BACKGROUND OF THE INVENTION

1. Field of the Invention

The present invention relates to mechanical sound reproduction mechanisms. As is known to those skilled in the art, such mechanisms directly or mechanically connect the needle with the speaker diaphram such that vibrations of the needle as a consequence of engaging the record grooves are transferred to the diaphram thereby vibrating the latter to cause an audible reproduction of the recorded message.

More specifically, the present invention relates to such mechanical sound reproduction mechanisms in devices of the type adapted to present an audio-visual program. Such devices permit viewing or projection of a transparency image and provide an accompanying sound presentation consisting of separate messsages which are audibly reproduced in synchronization with the display of the respective image transparencies.

2. The Prior Art

Audio-visual devices of the type generally referred to are known in the prior art. In this regard, reference is made to U.S. Pat. No. 3,484,160 in the names of Marvin I. Glass and Gunars Licitis and assigned to Marvin Glass & Associates. The device shown in this patent is in the form of a stroscopic viewer with mechanical sound reproduction means. This device is adapted to receive an audio-visual unit of the type shown in U. S. Pat. No. 3,432,230 in the names of Marvin I. Glass and Gunars Licitis and also assigned to Marvin Glass & Associates. Such audio-visual unit consists of a disc mounting a plurality of transparency pairs (for stereoscopic viewing) in a circular or annular pattern and a record which is co-axially mounted on such disc for rotation relative thereto.

According to the operation of the device shown in U.S. Pat. No. 3,484,160, an advance lever is manually operated for intermittently rotating the disc thereby to present the transparency pairs in seriatim for stereoscopic viewing. After the selected pair of transparencies is placed in viewing position by operation of the advance lever as just described, another lever or bar is manually operated to bring the sound reproduction mechanism into engagement with the record for audibly reproducing the message corresponding to the transparency pair being viewed. Thus, according to the operation of this prior art device, it is necessary for the operator to actuate two separate levers in the proper sequence to present the audio-visual program.

According to the device disclosed in U.S. Pat. No. 3,484,160, the speaker diaphram is engaged by the tone-arm intermediate the ends of the latter. One end of the tone-arm supports the needle and the other end of the tone-arm is pivoted to permit the necessary movement of the needle as it moves radially with respect to the record. Consequently, the point of engagement between the speaker and the tone-arm moves during movement of the needle from the outermost portion of the record to the innermost portion thereof. In other words, during most of the audio presentation, the speaker is engaged by the tone-arm at a point which is eccentric to the speaker cone. This eccentric speaker engagement is not conducive to optimum speaker operation.

SUMMARY AND OBJECTS OF THE INVENTION

The present invention relates to an improved mechanical tone-arm and the mounting means therefor, to means for momentarily camming the needle away from the record in response to movement of the advance mechanism for the transparency holder, and to means mounting the speaker diaphram thereby to permit bodily shifting movement of the latter during large movements of the tone-arm as a consequence of actuation of the aforesaid camming means.

A primary object of the present invention is the provision of a new and improved mechanical sound reproduction mechanism.

Another object of the present invention is the provision of a mechanism of the type described which includes a tone-arm generally in the form of a unitary right-angle member engaged with a fulcrum type of support and held in engagement therewith by spring means, which spring means also act to urge the needle into engagement with a phonograph record.

Another object of the present invention is the provision of the aforesaid mechanical sound reproduction mechanism in an audio-visual device, wherein camming means momentarily separate the needle from the record as a consequence of operation of the advance mechanism employed to move a transparency holder for individual, successive viewing of the transparencies supported by such holder.

Still another object of the present invention is the provision of a speaker mounting means in mechanism of the type referred to in the foregoing objects, wherein the speaker diaphram and the tone-arm are connected together for movement in unison as a consequence of vibratory movements of the tone-arm and wherein bodily shifting movement of the speaker diaphram is permitted during large movements of the tone-arm during separation of the needle from the record in indexing the tone-arm from one recorded message to a successive one of said messages.

These and other objects and advantages of the present invention will become apparent from the following specification disclosing a preferred embodiment shown in the accompanying drawings.

DESCRIPTION OF THE PREFERRED EMBODIMENT

Figure 1:
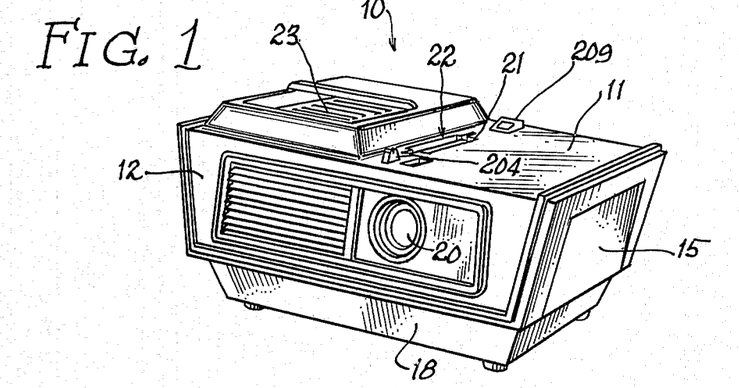
FIG. 1 is a perspective view of an audio-visual device embodying the present invention; this view shows the front, top and one side of the housing of this device.
Figure 2:
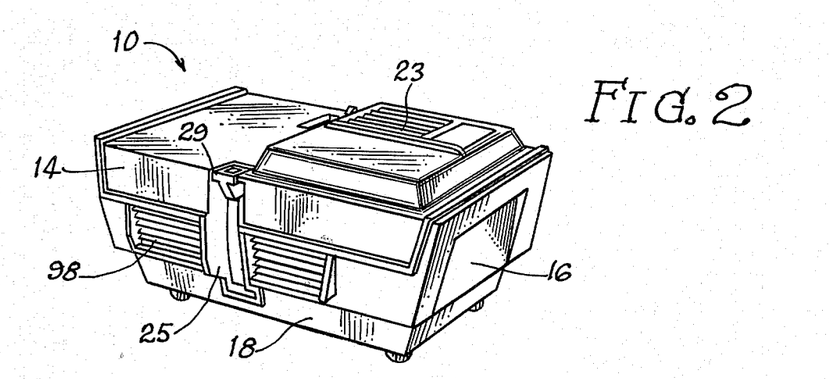
FIG. 2 is a perspective view of the audio-visual device, showing the top, rear and other side thereof.

Referring to FIGS. 1 and 2, the embodiment of the present invention shown for purposes of illustration is embodied within an audio-projector, generally designated 10. As will be seen from the following description, this device is adapted to project successive image transparencies on a remote screen, or other reflective surface, and to present a separate audible recorded message for each of the transparencies projected for visual display. It will be understood that the present invention is not to be limited for use with the particular audio-projector illustrated, or even with an audio or sound projector for that matter. For example, the present invention may be incorporated within a soundviewer, stereoscopic or otherwise, as well as many types of phonographs.

Figure 5:
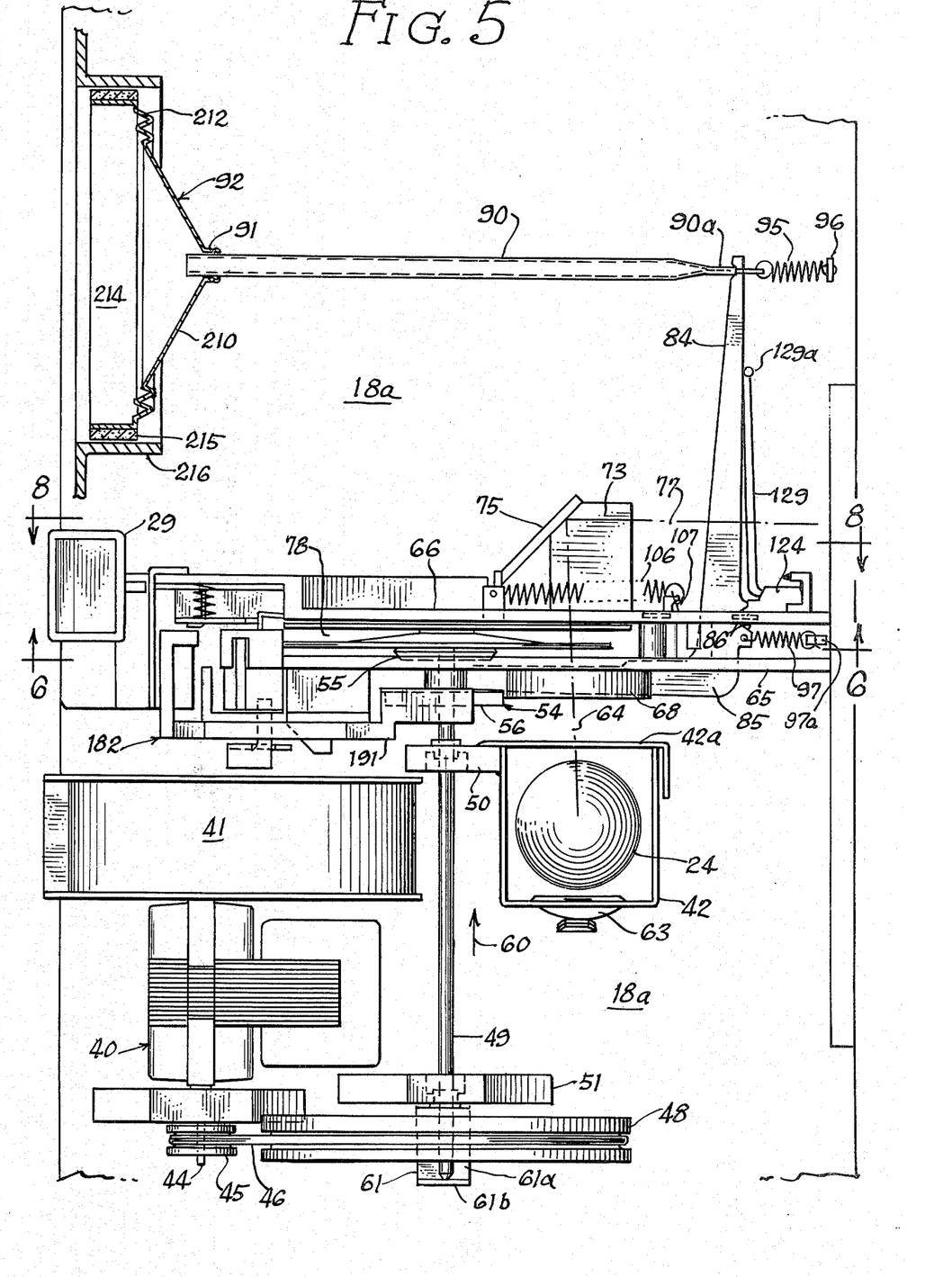
FIG. 5 is an enlarged, top plan view of the audio-visual device with the housing removed to show the various internal parts.

The projector 10 includes a housing having a top wall 11, front wall 12, rear wall 14, side walls 15, 16 and a bottom or base 18. The front wall 12 includes an opening for receiving an adjustable optical lens assembly 20; this assembly is of well known construction and is of the type used in slide and moving picture projectors. The top wall 11 includes a slot 21 for receiving an audio-visual unit, generally designated 22. This top wall also includes a louvered formation 23 to permit ventillation for the projection bulb 24 (FIG. 5).

The rear wall 14 of the housing includes a cavity 25 formed in part by a plate including a generally U-shaped slot which receives a portion of an advance lever 28 (FIG. 6) mounting an advance button 29 on the distal end thereof. As will become apparent herein, actuation of this advance button serves, among other things, to move the transparency holder intermittently for successive visual display of the transparencies thereon.

Figure 3:
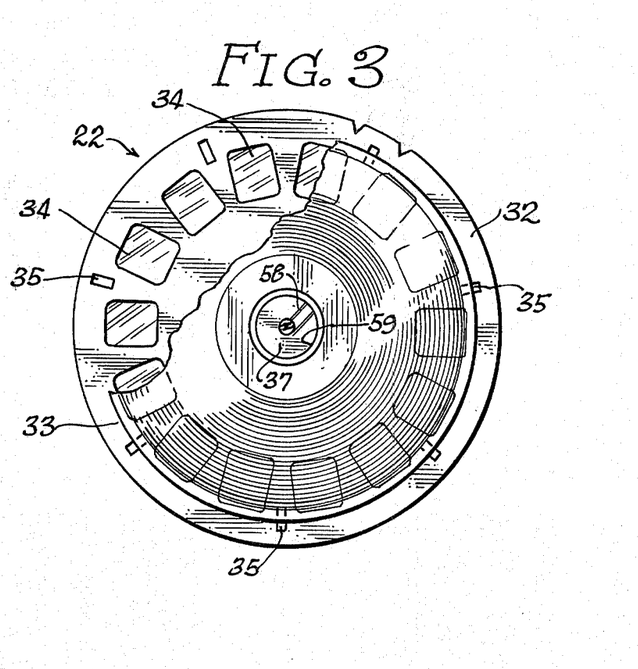
FIG. 3 is an enlarged, elevational view of the audio-visual unit for use with the audio-visual device illustrated in FIGS. 1 and 2.
Figure 4:
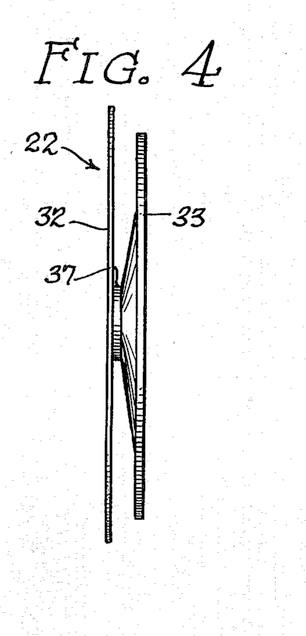
FIG. 4 is a side, elevational view of the audio-visual unit shown in FIG. 3.

Referring now particularly to FIGS. 3 and 4, the audio-visual unit is in the form of a disc 32 and a phonograph record 33 co-axially mounted therewith. The disc 32 includes seven pairs of transparencies, or fourteen individual transparencies 34, arranged in a circular or continuous pattern adjacent the periphery of the disc.

At this time it should be mentioned that the audio-visual unit is of the type disclosed and claimed in the above-mentioned U.S. Pat. No. 3,423,230. As will be understood by reference to that patent, the transparencies are provided in pairs for stereoscopic viewing in the audio-viewer of the type shown in the aforementioned U.S. Pat. No. 3,484,160. However, since the audio-projector 10 illustrated herein projects the images on a remote screen and does not provide for stereoscopic viewing, only one transparency 34 of each of the transparency pairs is actually projected. Thus, it will be understood that the audio-projector 10 which embodies the present invention may employ the same audio-visual units that are used in the audio-viewer disclosed in U.S. Pat. No. 3,484,160.

The transparency disc 32 includes seven indexing apertures 35 equally spaced around the periphery thereof. These apertures are engaged by an advance pawl to cause the transparency disc to be intermittently rotated for successively presenting the transparencies for projection. The disc 32 mounts a hub 37 which rotatably mounts or journals the phonograph record 33. Thus, the record 33 is co-axially mounted by the disc 32 for rotation relative thereto.

It will be understood that the record 33 has seven separate messages recorded thereon. The first or starting message is recorded adjacent the periphery of the record. The record 33, which extends over the transparencies 34, is made of a transparent material, such as a clear vinyl, in order to permit the passage of light through the record as well as through the image transparencies.

The transparency disc 32 is preferably provided with indicia, to aid the operator to orient or position the transparency disc in the proper position for the beginning of a program. The operator orients the disc 32 in a proper position at the beginning of a program by locating appropriate indicia in alignment with suitable indicia on the top housing wall 11 adjacent the slot 21. The disc 32 may be provided with other indicia used to orient the transparency disc in the desired position when the audio-visual unit 22 is used with other equipment, such as the audio-viewer disclosed in the above-mentioned Glass et al. U.S. Pat. No. 3,484,160. For a more complete description of the audio-visual unit 22, reference should be had to the aforementioned Glass et al. U.S. Pat. No. 3,432,230.

Referring to FIG. 5, the base 18 includes a base plate 18a which mounts an electric motor 40. It will be apparent to those skilled in the art that additional elements of support, such as brackets or platforms, may be used as means to mount or otherwise support the electric motor 40 and other elements referred to hereinafter, on the base plate 18a. Since such mounting means do not form any part of the present invention, and for the sake of simplicity, they are not shown or further described herein. Electric motor 40 powers an impeller or blower assembly 41, of known construction, for cooling the projection bulb 24, the latter being contained within the usual chimney 42. One end of the output shaft 44 of the electric motor 40 mounts a drive pulley 45, which pulley is engaged with a drive belt 46. This drive belt is also in engagement with a larger flywheel type pulley 48. This fly-wheel is mounted on a shaft 49, the latter being rotatably mounted by journal assemblies 50, 51, each supported by the base plate 18a. It will be understood that the shaft 49 is mounted for axial sliding movement as well as for rotation by the journal assemblies 50, 51.

The shaft 49 supports at one of its ends a record driving hub, generally designated 54. This hub includes an annular driving flange 55 and an annular camming flange 56. The driving flange 55 is provided with one or more teeth (not shown) for being received in a recess 58 (FIG. 3) formed in an annular recess 59 in the record 33. This interengagement between one of the teeth and the recess 58 provides a non-slipping type of engagement between the record and the hub 54 thereby to permit the latter to drive and rotate the record.

The shaft 49 is constantly urged in the direction of the arrow 60 by means of a leaf-spring 61. To this end, the spring 61 is in the form of a right-angle leaf-spring having one leg 61a suitably secured to the base plate 18a and the distal end of the other or upstanding leg 61b engaged with the end of the shaft 49. It will be understood that the spring 61 acts to urge the driving hub 54 into engagement with the record 33 forming part of the audio-visual unit 22.

It is apparent that the electric motor 40 serves to drive or rotate the driving hub 54 in addition to powering the impeller or blower 41. Suitable switches (not shown) may be provided to energize the motor 40 and projection bulb 24 independently of each other, or these two components, or one of them, may be energized simply by plugging the electrical cord (not shown) into a wall outlet.

The chimney 42 includes the customary reflector 63 for reflecting part of the light energy from the bulb 24 in a direction indicated by the optical axis 64. Of course, the wall 42a of the chimney is suitably apertured to permit light to pass along the optical axis 64.

The base plate 18a forming part of the housing of the projector 10 mounts first and second wall plates 65, 66. The plate 65 has an aperture mounting a condensor lens assembly 68 which cooperates with the reflector 63 to define the optical axis 64. The plate 65 includes a large opening (not shown) which serves, among other things, to permit the driving hub 54 and the phonograph needle to be brought into engagement with the record 33.

Figure 8:
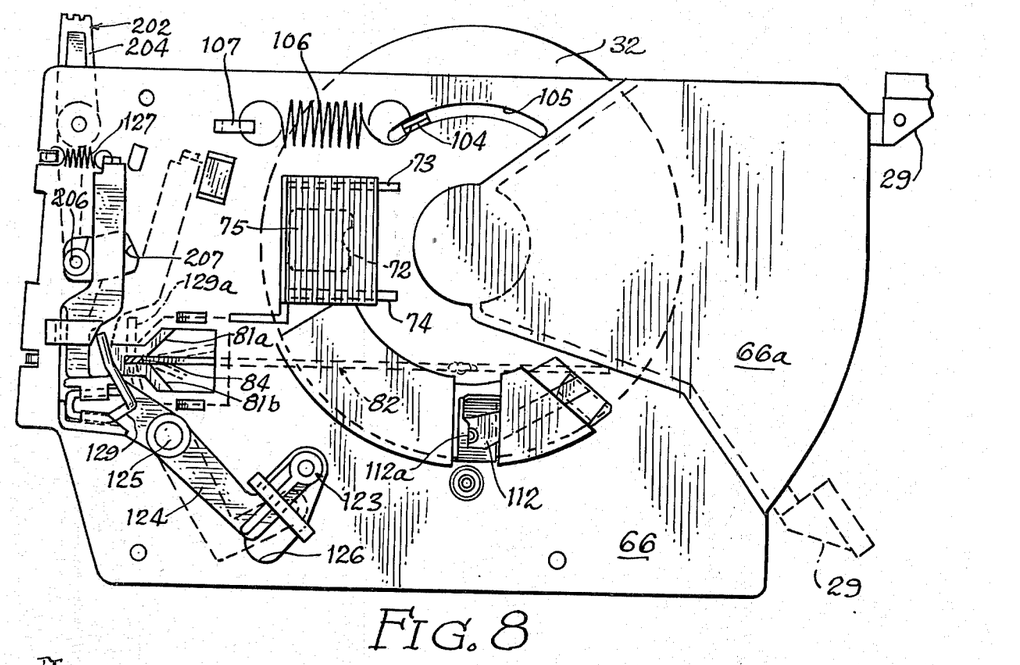
FIG. 8 is a section taken along the line 8—8 of FIG. 5.

Referring to FIGS. 5 and 8, the wall plate 66 includes an aperture 72 in alignment with the optical axis 64. Adjacent this aperture, the plate 66 mounts upper and lower brackets 73, 74, respectively, which brackets mount a mirror 75 inclined with respect to the optical axis 64 so that reflected light is projected along the optical axis 77 and through the objective lens assembly 20 (FIG. 1).

The wall plates 65 and 66 cooperate to define a space 78 in communication with the slot 21 in the top housing wall 11. This space is, of course, provided to receive one of the audio-visual units 22.

Figure 9:
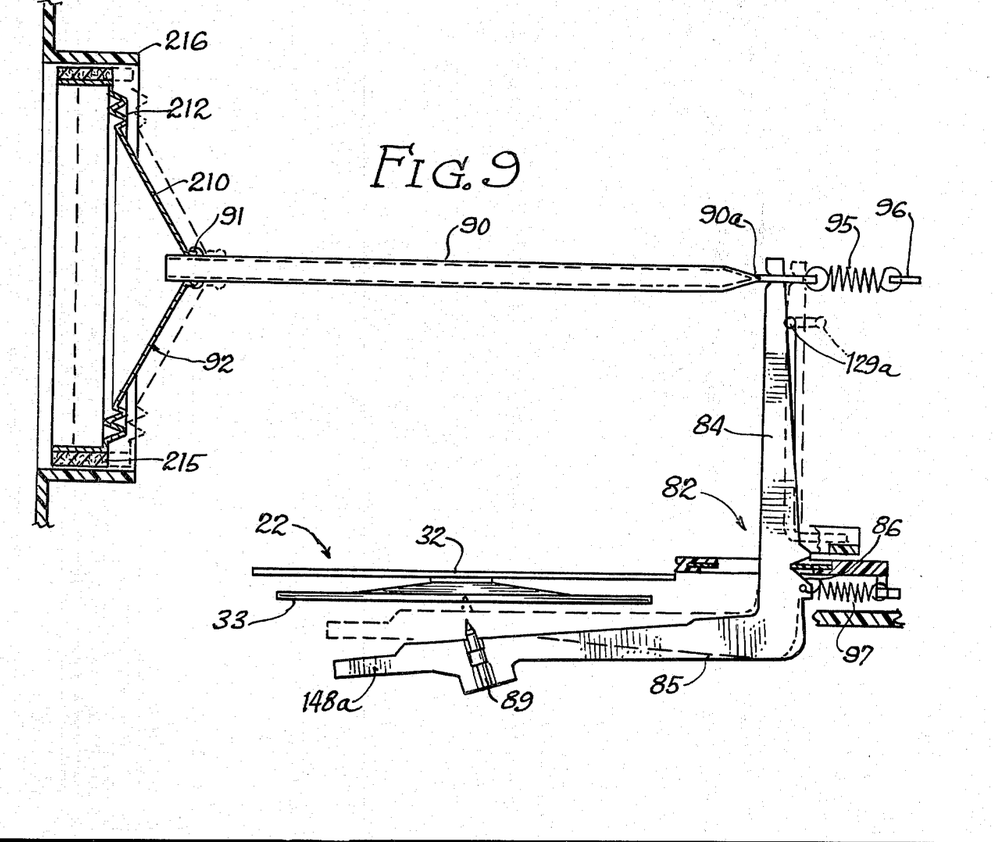
FIG. 9 is a partial, top plan view similar to FIG. 5.

The plate 66 includes an opening 80 (FIG. 6) mounting a bearing plate 81, the latter having an opening defined in part by edges 81a, 81b which constitute a V-shaped fulcrum for a tone-arm, generally designated 82. As best seen in FIGS. 5 and 9, this tone-arm has a first arm 84 and a second arm 85. The arm 84 includes a V-shaped notch 86 in pivotal engagement with the fulcrum defined by bearing plate edges 81a. 81b; thus, it should be apparent that the tone-arm 82 is mounted for pivoting engagement in its own plane and for pivoting movement between the solid and broken line positions shown in FIG. 6. During the course of this last mentioned pivoting movement, the arm 85 is swung in a plane parallel with the plane of the phonograph record 33.

The arm 85 of the tone-arm mounts a needle 89 (FIG. 7) for engagement with the phonograph record 33. The distal end of the other arm of the tone-arm, i.e., the arm 84, is pivotally engaged with one end of an actuator stem 90 (FIG. 5). To this end, an ear plate 90a is secured to the stem 90 and apertured to receive the arm 84. The other end of this stem is fixedly connected to a cylindrical formation 91 forming part of the speaker cone or diaphram 92.

A first spring 95 has one of its ends connected to the distal end of the arm 84 and the other of its ends appropriately anchored to a rigid, upstanding member 96 supported by the base plate 18a. Another spring 97 has one of its ends connected with the arm 84 of the tone-arm adjacent the V-shaped notch 86, as seen in FIG. 5; the other end of this spring is suitably anchored in a fixed position to a projection of a carried on plate 66. It will be understood that the springs 95 and 97 cooperate to hold the tone-arm 82 in pivotal or swinging engagement with the fulcrum defined by the bearing plate edges 81a, 81b, but that the spring 95 overpowers the spring 97 to a degree sufficient to hold the needle 89 into proper engagement with the record. Of course, it will be apparent that engagement of the needle 89 with the grooves in the record 33 will serve to vibrate the tone-arm 82 in its own plane, i.e., a plane containing both of the arms 84, 85, thereby in turn to reciprocate the stem 90 for vibrating the speaker 92. This vibration of the speaker results in an audible reproduction of the recorded messages on the record. As noted in FIG. 2, the rear housing wall 14 contains louvers 98 adjacent the speaker 92 to facilitate the passage of sound to the exterior of the projector housing.

Figure 6:
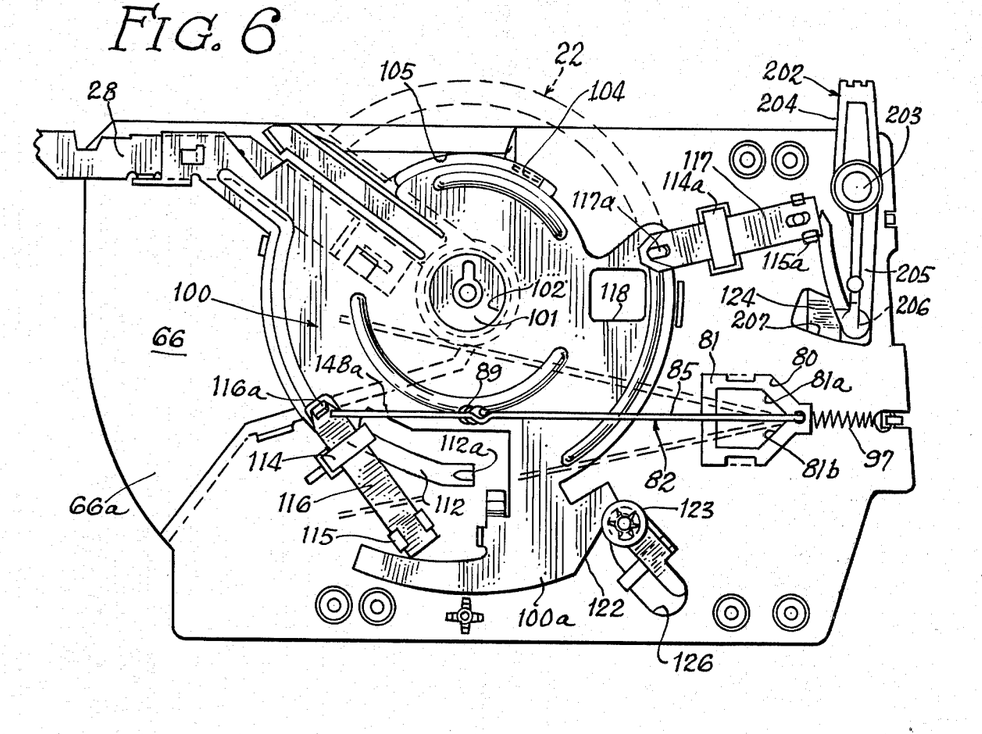
FIG. 6 is a section taken along the line 6—6 of FIG. 5.

Referring primarily to FIG. 6, the plate 66 rotatably mounts an advance plate, generally designated 100. To this end, the plate 66 mounts a hub or bearing cap 101 rotatably receiving an annular flange 102 formed on the advance plate 100. It should be understood that this advance plate supports the previously mentioned advance lever 28 and advance button 29. The plate 66 is provided with an integral offset portion 66a to enclose and guide the advance lever 28 for oscillating or swinging movement. The advance plate 100 includes a projection 104 (FIG. 8) extending through an arcuate slot 105 formed in the plate 66. This projection is engaged by one end of a coil spring 106; the other end of this spring is connected to a projection 107 mounted on the plate 66. It will be understood that the spring 106 acts to urge the advance plate 100 in a clockwise direction as seen in FIG. 6. Rotation of the advance plate in this clockwise direction is limited by suitable stop means.

The advance plate 100 includes an intergral advance finger 112. The distal end of this finger includes a projection or lug 112a (FIG. 6) adapted to snap-in one of the apertures 35 in the transparency disc 32. It is this engagement between the lug 112a and the apertures 35 which permits the advance plate to rotate or index the transparency disc 32.

The plate 66 includes bracket formations 114, 115 which serve to mount a spring-finger 116. This spring-finger has a lug 116a which is urged into engagement with the apertures 35 in the transparency disc 32 thereby to prevent rotation of the latter during return movement of the advance plate 100. Preferably, another spring-finger 117, similar or identical to the finger 116, is also provided to prevent return movement of the transparency disc 32. This finger includes a projection 117a adapted to be received in one of the apertures 35 in the transparency disc. The finger 117 is mounted from the plate 66 by suitable brackets or formations 114a, 115a. When an audio-visual unit 22 is forced downwardly through the slot 21, the transparency disc 32 slides between the advance plate 100 on plate 66 and the ends of the fingers 116, 117 for being securely held in place.

It should be apparent that successive actuation of the advance button 29 (downwardly and then upwardly between the solid and broken line positions indicated in FIG. 8) will serve to impart intermittent rotation to the transparency disc 32 for presenting alternate transparencies 34 (only one transparency of each pair of transparencies is used by the projector 10) in series for projection on a remote screen or other reflective surface. In this regard, it will be noted that the advance plate 100 includes a projection aperture 118 which serves to define a projection gate; this aperture is in alignment with the optical axis 64 when the actuating button is in the normal or raised position (solid lines as seen in FIG. 8). The portion of the advance plate 100 adjacent the aperture 118 acts as a shutter to prevent projection of the bright light on the remote screen during indexing of the transparency disc.

The advance plate 100 includes an integral co-planar extension 100a defining a camming edge 122. This camming edge is arranged to engage a roller 123 rotatably mounted at one end of an arm 124 (FIG. 8). This arm is mounted for pivotal movement about a hub 125, the latter being suitably supported from the plate 66. An aperture 126 is provided in the plate 66 to permit movement of the roller 123 and the arm 124 as a result of movement of the advance plate in a manner to be described hereinbelow.

The end of the arm 124 remote from the end thereof which supports the roller 123 is engaged by one end of a spring 127, the other end of which spring is appropriately anchored to the plate 66. Thus, the spring 127 acts to rotate the arm 124 counterclockwise (as seen in FIG. 8) to maintain the roller 123 in engagement with the camming edge 122. The arm 124 mounts a wire 129; the distal end 129a of this wire engages the arm 84 of the tone-arm 82 as seen in FIG. 5. When the arm 124 is rocked clockwise (FIG. 8) the spring 129 is thereby moved bodily about the axis defined by the hub 125. Since the distal end 129a of the wire is engaged with the arm 84, this movement of the wire 129 acts to pivot the tone-arm 82 in a counterclockwise direction (from the position of FIG. 5 to the position of FIG. 9) in its own plane thereby to move the needle 89 away from the record 33. This rocking movement is imparted to the arm 124 (when the advance plate 100 is rotated to present a successive image transparency 34) as a consequence of the engagement between the camming surface 122 and the roller 123. Thus, each time the advance button 29 is depressed to bring a successive transparency into position for projection, the needle is momentarily moved away from the record. Of course, upon return movement of the advance plate, the springs 95, 97 act to re-engage the needle with the record.

Figure 7:
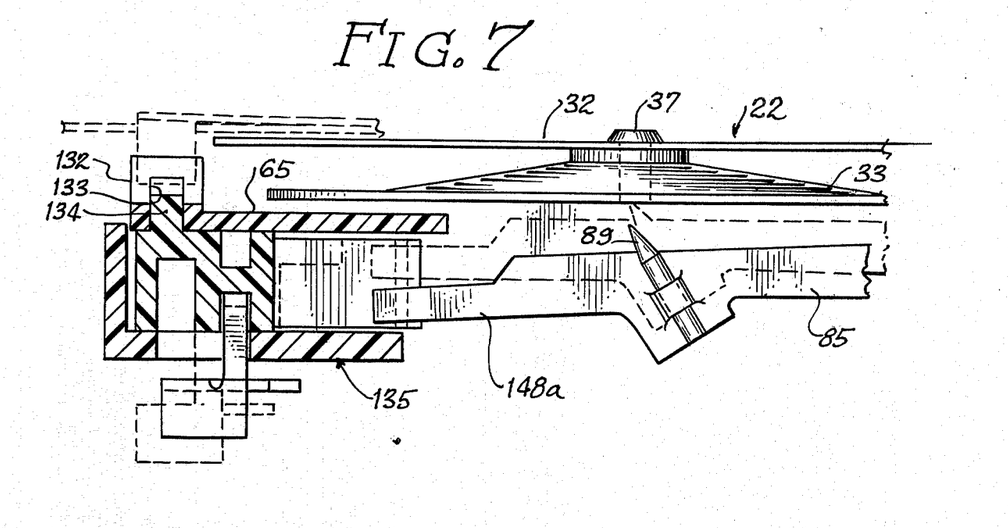
FIG. 7 is an enlarged, fragmentary, top plan view primarily showing the audio-visual unit and the adjacent portion of the tone-arm.

Referring particularly to FIG. 7, the plate 65 includes an integral, linear formation 132 having a slot 133 extending the length thereof, which slot opens into or extends through the plate 65. The slot 133 slidably receives a rib 134 integral with a tone-arm indexing block, generally designated 135. It will be understood that such indexing block is mounted, primarily by the slot 133, for vertical reciprocal movement.

The indexing block 135 includes a suitable formation (not shown) defining a pocket for receiving an integral extension 148a of the arm 85 constituting part of the tone-arm 82. It will be understood that the indexing block 135 is indexed or stepped upwardly in intermittent fashion in response to successive actuation of the advance plate 100. This upward indexing movement of the indexing block serves to position the needle 89 at locations corresponding to the starting grooves on the record 33. It will be understood that such messages are recorded from the outside of the record toward the center thereof.

The construction and operation of the indexing block 135 is explained in detail in the co-pending application of Anatoli Brushenko, Ser. No. 476,716, filed June 5, 1974. The disclosure of this co-pending application is incorporated herein by reference.

As fully explained in such application, the indexing block is automatically reset (lowered) to position the needle for engaging the starting groove of the outermost or first message on the record in response to cycling of the advance plate a number of times corresponding to the number of transparency pairs —in the present embodiment such number is seven. Thus, the audio-visual program may be continuously and repeatedly presented merely by repeated actuation of the advance button 29 in the manner explained herein.

As explained in the aforementioned application, the indexing block is also automatically reset in response to movement of the advance button to a "load" position. This automatic repositioning of the needle 89 is achieved in part by a load-lever, generally designated 182 (FIG. 5). This load-lever includes an arm 191 having an inclined camming surface (not shown) which is brought into engagement with the camming flange 56 of the hub 54 for disengaging the driving flange 55 from the record 33. Again, reference should be had to the aforementioned co-pending application for an understanding of the operation of the load-lever 182.

Thus, it will be understood that successive actuation of the actuator button 29 as described will cause the alternate transparency images 34 on the disc 32 (only alternate images, i.e., only one image in each pair of images is employed by the projector shown herein for purposes of illustration) to be projected in series and that the tone-arm will be indexed to provide an audible reproduction of the messages which correspond to the respective transparencies being projected. Synchronization between the image projected and its accompanying audio message (which was initially established by proper manual positioning of the transparency disc 32 and movement of the actuator button 29 to the "load" position) will of course be maintained.

It is sometimes desirable to replay or repeat the audio message while its associated image transparency remains projected on the remote screen. The projector 10 according to the present invention provides such mechanism.

Referring to FIGS. 6 and 8, a replay lever, generally designated 202, is pivotally mounted intermediate its ends by a hub or pin 203, the latter being supported by the plate 66. The replay lever has one arm portion 204, the distal end of which extends through a suitable opening in the housing top wall 11 thereby to permit manual actuation of the replay lever. The replay lever has another arm 205, the distal end of which mounts a roller 206. This roller extends through an enlarged opening 207 formed in the plate 66.

It is seen from FIG. 8 that the roller 206 engages the lever 124. When the replay lever 202 is swung clockwise (FIG. 6), the roller 206 imparts clockwise rotation (FIG. 8) to the arm 124 thereby to swing the wire 129 about the hub 125 which in turn causes the tone-arm 82 to pivot in its own plane to disengage needle 89 from the record. When the needle is so disengaged momentarily from the record, it is allowed to fall downwardly under the action of gravity until the tone-arm extension 148a strikes an indexing stop on the block 135 whereupon the needle will be positioned for entering the starting groove of the particular recorded message which has just been played.

The speaker 92 includes a frusto-conical portion 210 integral with the cylindrical portion 91. The speaker may be either circular, elliptical or oval in cross-section; thus, the term frusto-conical as used herein and in the accompanying claims shall include speakers with these specific and similar cross-sections. The frusto-conical portion 210 is integral with a series of concentric folds 212 formed of the speaker material, which material may be a stiff styrene, by way of example. The outermost fold of the speaker material is integral with an annular speaker portion 214, which portion may be cemented to a ring 215 formed of polyethylene or other suitable material. The ring 215 is concentric with and slidably mounted in another ring 216. The ring 216 is fixedly mounted by the base plate 18a.

As is evident from reference to FIGS. 5 and 9, the ring 215 slides axially within the ring 216 during large movements of the tone-arm 82 occasioned by separation of the needle 89 from the record and re-engagement of the needle with the starting groove of the successive message on the record. These large movements of the tone-arm are the result of separating the needle from the record during indexing of the tone-arm. This sliding movement between the rings 215 and 216 permits the necessary bodily shifting movement of the speaker diaphram 210. Without the provision of this slidable mounting of the speaker, the frusto-conical portion 210 could be deflected or deformed (as a consequence of the large movements of the tone-arm 82) to an extent that the speaker would be damaged.

It may be desirable in some instances to provide a lubricant between the adjacent surfaces of the rings 215, 216 to facilitate the relative sliding movement. However, it will be understood that the frictional engagement between the rings 215, 216 is such that there is little or no relative sliding movement during the audible reproduction of a recorded message. During such audible reproduction, the frusto-conical portion 210 vibrates relative to the speaker portion 214 as a consequence of the reciprocal vibration of the stem 90. As mentioned earlier, the cylindrical portion 91 of this speaker is secured to the stem 90 such that these two members move together in unison at all times.

Figures 10, 11:
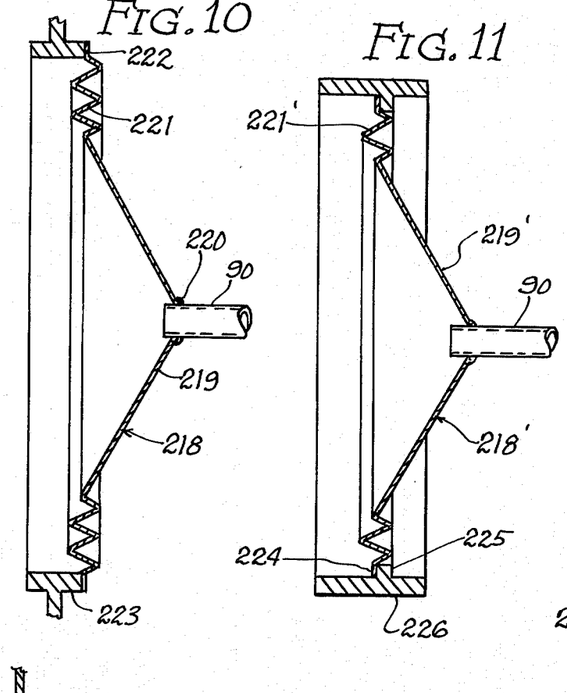
FIG. 10 is a sectional view of a modified speaker and mounting arrangement therefor.
FIG. 11 is a sectional view of another modified speaker and mounting arrangement therefor.

A modified speaker, generally designated 218, is illustrated in FIG. 10. This speaker includes a frusto-conical portion 219 having a central aperture 220 receiving the speaker actuator stem 90. This stem is heat-staked or cemented to the frusto-conical portion 219 such that these two members vibrate together in unison. The frusto-conical portion 219 is integral with a plurality of concentric folds 221 formed of the speaker material. The outermost fold is integral with an annular flange 222, which flange is secured to an annular member 223. This annular member is fixedly mounted by the base plate 18a of the projector housing.

In the embodiment of the speaker shown in FIG. 10, the folds 221 deflect or deform to permit the bodily shifting movement of the frusto-conical portion 219 as a result of the large movements of the tone-arm 82. Thus, these concentric folds of material permit the frusto-conical portion 219 to shift bodily and without any deformation of the frusto-conical portion itself.

Another modified speaker arrangement, generally designated 218', is shown in FIG. 11. Here, the speaker includes a frusto-conical portion 219' and an annular flange 224, each made of a stiff styrene material, for example. These sections of the speaker are connected together by concentric folds 221' made of vinyl. The folds may be formed by spraying vinyl over a suitable die which exposes the flange 224 and a peripheral portion of the cone 219' such that the resulting vinyl layer will adhere to these other speaker portions. The flange 224 is secured to an annular rib 225, the latter being integral with a ring 226 fixedly supported from the base plate 18a of the projector housing. Again, the folds 221' permit the necessary bodily shifting movement of the frusto-conical speaker portion 219'.

Figure 12:
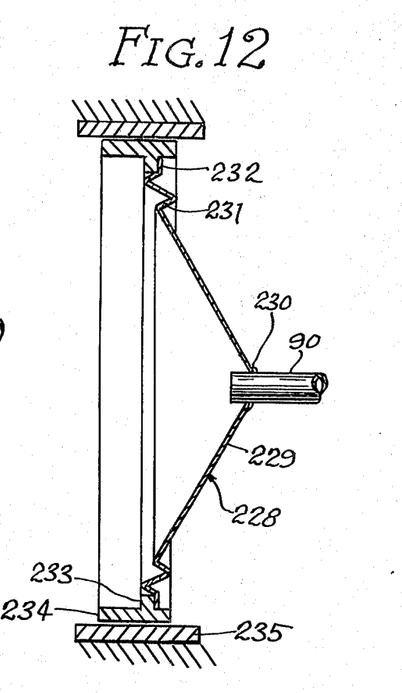
FIG. 12 is a sectional view of still another modified speaker and mounting arrangement therefor.

Still another modified speaker arrangement is shown in FIG. 12. Here, the speaker, generally designated 228, includes a frusto-conical portion 229 which is centrally apertured, as at 230, to receive the stem 90. The frusto-conical portion 229 joins with concentric folds 231 of the speaker material. The outermost fold is integral with a flange 232 which is secured to an annular rib 233. This rib is integral with a ring 234, which ring is concentric with and slidably received within another ring 235. The ring 235 is fixedly mounted by the base plate 18a.

The ring 234 is adapted for sliding movement within the ring 235. Thus, this relative sliding movement between the rings 234, 235 permits the bodily shifting movement of the speaker 229 occasioned by the large movements of the tone-arm to which the speaker is attached. Of course, it will be understood that the ring 234 may be slidably mounted by means other than the continuous ring 235 — various forms of guides may be provided to mount the ring 234 and to permit the same to slide axially.

Figure 13:
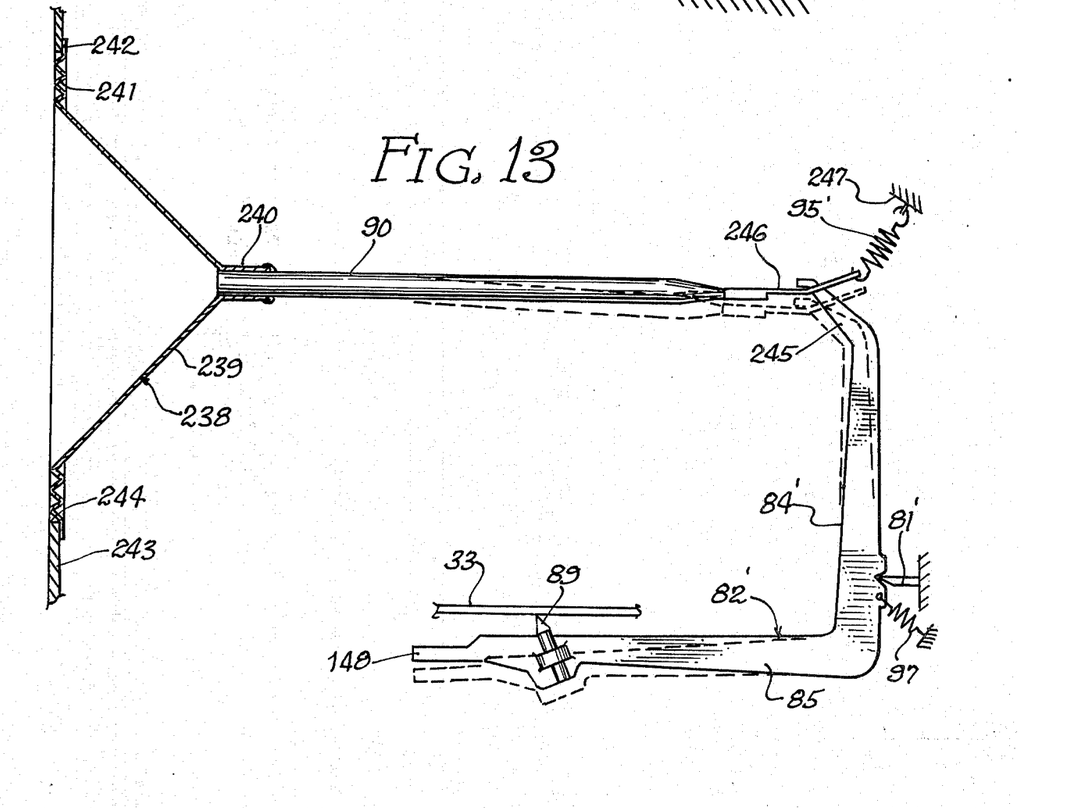
FIG. 13 is a top plan view, largely diagramatic in form, showing a modified speaker and modified tonearm.

A final speaker arrangement is shown in FIG. 13. A speaker, generally designated 238, includes a frusto-conical portion 239. This frusto-conical portion is integral with a cylindrical portion 240, which portion receives the actuator stem 90 and is fixedly mounted thereto, as by cementing. The frusto-conical speaker diaphram portion 239 is integral with a number of concentric folds 241 of speaker material. The outermost fold is integral with a flange 242, which flange is secured to a wall 243. This wall, which is fixedly mounted by the base plate 18a, includes a circular opening 244 to receive the portion of the speaker constituted by the concentric folds 241.

The tone-arm 82' is of slightly different configuration than the tone-arm 82 already described. In this regard, the arm 84' has the distal end thereof bent to form an arm portion 245. This end portion is pivotally engaged with an aperture formed in an ear plate 246, which plate is connected to the actuator stem 90. The ear plate includes another aperture receiving one end of a coil spring 95'. The other end of this spring is fixed to an anchor 247 such that the spring 95' is disposed at an angle with respect to the axis of the actuator stem 90.

When the modified tone-arm 84' is pivoted in its own plane about the fulcrum 81' (between the solid and broken line positions as shown in FIG. 13) during separation of the needle from the record when the tone-arm is indexed to position the needle at the starting groove of a successive message, the actuator stem 90 is bent slightly one side as shown, this movement being permissible by reason of the arrangement of the spring 95'. During this bending movement of the actuator stem 90, the frusto-conical speaker diaphram portion 239 will shift bodily, this movement being permitted by deflection of the concentric folds 241. Thus, in each of the speaker embodiments shown herein, the frusto-conical diaphram portion (which vibrates to reproduce the sound) does not itself deflect or deform but rather shifts or moves bodily as a consequence of the manner in which it is mounted. Accordingly, large movements of the tone-arm do not result in damage to the diaphram portion of the speaker.

I claim:

1. In a mechanical sound reproduction system for a phonograph record, the improvement comprising:
   a. a tone-arm generally in the form of a unitary right-angle member having first and second arms extending at approximately 90° to each other, and having an inside edge surface along an edge of said first and second arms facing each other, and having an outside edge surface along the opposite edge of said arms, said first and second arms lying in a first plane;
   b. a needle mounted by said second arm adjacent the distal end thereof;
   c. support means for mounting a phonograph record for rotation in a plane parallel to a second plane which is perpendicular to said first plane;
   d. fulcrum means formed by an edge surface of a bearing plate engaging said tone-arm intermediate the ends thereof and at the outside edge surface thereof thereby supporting the tone-arm for pivoting movement in said first plane, said needle being moved toward and away from said phonograph record during pivoting movement of said tone arm in said first plane, said fulcrum means also permitting continuous pivoting movement of said second arm in said second plane during playback operations so that said needle traverses said record during engagement therewith;
   e. first and second spring means connected with said tone-arm for urging movement of said tone arm in said first plane to maintain the needle in engagement with said phonograph record and to maintain said tone arm in engagement with said fulcrum;
   f. a speaker diaphram; and
   g. actuator means connecting said diaphram with the distal end of said first arm such that vibratory movement of said tone-arm in said first plane as a consequence of engagement of said needle with the grooves of a phonograph record imparts corresponding vibratory movement to said diaphram thereby audibly reproducing the message recorded on the phonograph.

2. The improvement according to claim 1 further defined by:
   a. said actuator means connecting said diaphram with the distal end of said first arm such that the diaphram and the tone-arm move together in unison during all movements of the needle perpendicular to said second plane; and
   b. mounting means engaged with said diaphram, said mounting means permitted bodily shifting movement of said diaphram relative thereto to compensate for large movements of the diaphram occasioned by separation of said needle from a phonograph record and re-engagement therewith.

3. The improvement according to claim 2 further defined by:
   a. said diaphram being generally frusto-conical in shape;
   b. said mounting means including concentric folds of material integral with the material constituting said diaphram;
   c. a fixedly mounted supported ring having a portion of the outermost of said material folds connected thereto; and
   d. said material folds being capable of flexing and deforming to allow said bodily shifting movement of the diaphram.

4. The improvement according to claim 2 further defined by:
   a. said diaphram being generally frusto-conical in shape;
   b. a ring connected with said diaphram adjacent the periphery of the latter; and
   c. fixedly mounted guide means engaged with said ring and mounting the latter for axial sliding movement, the sliding movement of said ring permitting said bodily shifting movement.

5. In a mechanical sound reproduction system for a phonograph record, the improvement comprising:
   a. a tone-arm generally in the form of a unitary right-angle member having first and second arms extending at approximately 90° to each other;
   b. fulcrum means engaging said tone-arm intermediate the ends thereof thereby supporting the tone-arm for pivoting movement in a first plane containing both of said arms, said fulcrum means also permitting pivoting movement of said second arm in a second plane perpendicular to said first plane;
   c. support meas for mounting a phonograph record for rotation in a plane parallel to said second plane;
   d. a needle mounted by said second arm adjacent the distal end thereof;
   e. a speaker diaphram;
   f. actuator means connecting said diaphram with the distal end of said first arm such that vibratory movement of said tone-arm in said first plane as a consequence of engagement of said needle with the grooves of a phonograph record imparts corresponding vibratory movement to said diaphram thereby audibly reproducing the message recorded on the phonograph; and first and second spring means respectively connected with said first arm on opposite sides of said fulcrum means, said first and second spring means cooperating to maintain said tone-arm in pivoting engagement with said fulcrum means, the one of said first and second spring means nearer the distal end of said first arm being stronger than the other of said spring means thereby acting to maintain the needle in engagement with a phonograph record.

6. The improvement according to claim 5 wherein said fulcrum means engages said first arm adjacent the portion thereof which adjoins said second arm.

7. In an audio-visual device of the type adapted for use with an audio-visual unit including a transparency holder and an associated sound record, wherein such holder mounts a plurality of discrete image transparencies for being individually displayed in response to predetermined intermittent movement of the holder and wherein said record includes separate recorded messages corresponding to respective transparencies on said holder, the improvement comprising:
   a. an advancing mechanism operable successively through an advance cycle for intermittently moving said holder for individual visual display of said transparencies;
   b. a tone-arm including a phonograph needle;
   c. indexing mechanism operated in response to actuation of said advancing mechanism through said advance cycle and engaging said tone-arm for intermittently moving said needle in a plane parallel with the record to successive positions corresponding to the starting grooves of respective messages on said record; and d. camming means operated in response to actuation of said advancing mechanism and comprising a camming edge carried by said advancing mechanism, cam follower means biased for engagement with said camming edge, and an elongated tone arm lifting member connected at one end thereof to said cam follower means, the other end thereof engaging said tone arm for camming said needle away from a phonograph record along a path perpendicular thereto at the beginning of movement of said advancing mechanism through said advance cycle and for establishing engagement between said needle and the starting groove of the successive message at the completion of movement of said advancing mechanism through said advance cycle.

8. The improvement according to claim 7 further defined by replay means engaged with said camming means for operating the latter independently of said advancing mechanism.

9. The improvement according to claim 7 further defined by:
a. a speaker diaphram;
b. actuator means connecting said diaphram with said tone-arm such that vibratory movement of said needle in a plane perpendicular to the record as a consequence of engagement of the needle with the grooves of a phonograph record imparts corresponding vibratory movement to said diaphram thereby audibly reproducing the message recorded on the phonograph, said actuator means connecting said diaphram with the tone-arm such that the diaphram and the tone-arm move together in unison during all movements of the needle perpendicular to the plane of the record; and
c. mounting means engaged with said diaphram, said mounting means permitting bodily shifting movement of said diaphram relative thereto to compensate for large movements of the diaphram occasioned by separation of said needle from a phonograph record and re-engagement therewith as a consequence of operation of said camming means.

10. The improvement according to claim 9 further defined by:
a. said diaphram being generally frusto-conical in shape;
b. said mounting means including concentric folds of material integral with the material constituting said diaphram;
c. a fixedly mounted support ring having a portion of the outermost of said material folds connected thereto; and
d. said material folds being capable of flexing and deforming to allow said bodily shifting movement of the diaphram.

11. The improvement according to claim 9 further defined by:
a. said diaphram being generally frusto-conical in shape;
b. a ring connected with said diaphram adjacent the periphery of the latter; and
c. fixedly mounted guide means engaged with said ring and mounting the latter for axial sliding movement, the sliding movement of said ring permitting said bodily shifting movement.

12. In an audio-visual device of the type adapted for use with an audio-visual unit including a transparency holder and an associated sound record, wherein such holder mounts a plurality of discrete image transparencies for being individually displayed in response to predetermined intermittent movement of the holder and wherein said record includes separate recorded messages corresponding to respective transparencies on said holder, the improvement comprising:
a. an advancing mechanism operable successively through an advance cycle for intermittently moving said holder for individual visual display of said transparencies;
b. a tone-arm generally in the form of a unitary right-angle member having first and second arms extending at approximately 90° to each other, said first and second arms lying in a first plane;
c. a needle mounted by said second arm adjacent the distal end thereof;
d. support means for mounting a phonograph record for rotation in a plane parallel to a second plane which is perpendicular to said first plane;
e. fulcrum means engaging said first arm intermediate the ends thereof thereby supporting the tone-arm for pivoting movement in said first plane, said needle being moved toward and away from said phonograph record during pivoting movement of said tone arm in said first plane, said fulcrum means also permitting continuous pivoting movement of said second arm in said second plane during playback operation so that said needle traverses said record during engagement therewith;
f. first and second spring means connected with said tone-arm for urging movement of said tone arm in said first plane to maintain the needle in engagement with said phonograph record and to maintain said tone arm in engagement with said fulcrum;
g. a speaker diaphragm;
h. actuator means connecting said diaphram with the distal end of said first arm such that vibratory movement of the tone-arm in said first plane as a consequence of engagement of said needle with the grooves of a phonograph record imparts corresponding vibratory movement to said diaphram thereby audibly reproducing the message recorded on the phonograph;
i. indexing mechanism operated in response to actuation of said advancing mechanism through said advance cycle and engaging said tone-arm for intermittently moving said needle in said second plane to successive positions corresponding to the starting grooves of respective messages on said record; and
j. camming means operated in response to actuation of said advancing mechanism and engaging said first arm for camming said tone-arm in said first plane thereby to separate said needle from a phonograph record at the beginning of movement of said advancing mechanism through said advance cycle and for establishing engagement between said needle and the starting groove of a successive message at the completion of movement of said advancing mechanism through said advance cycle.

13. The improvement according to claim 12 further defined by:

a. said actuator means connecting said diaphram with the distal end of the first arm such that the diaphram and the tone-arm move together in unison during all movements of the needle perpendicular to said second plane; and b. mounting means engaged with said diaphram, said mounting means permitting bodily shifting movement of said diaphram relative thereto to compensate for large movements of the diaphram occasioned by separation of said needle from a phonograph record and re-engagement therewith as a consequence of operation of said camming means.

14. In an audio-visual device of the type adapted for use with an audio-visual unit including a transparency holder and an associated sound record, wherein such holder mounts a plurality of discrete image transparencies for being individually displayed in response to predetermined intermittent movement of the holder and wherein said record includes separate recorded messages corresponding to respective transparencies on said holder, the improvement comprising:

a. an advancing mechanism operable successively through an advance cycle for intermittently moving said holder for individual visual display of said transparencies;

b. a tone-arm generally in the form of a unitary right-angle member having first and second arms extending at approximately 90° to each other;

c. fulcrum means engaging said first arm intermediate the ends thereof thereby supporting the tone-arm for pivoting movement in a first plane containing both of said arms, said fulcrum means also permitting pivoting movement of said second arm in a second plane perpendicular to said first plane;

d. support means for mounting a phonograph record for rotation in a plane parallel to said second plane;

e. a needle mounted by said second arm adjacent the distal end thereof;

f. a speaker diaphram;

g. actuator means connecting said diaphram with the distal end of said first arm such that vibratory movement of the tone-arm in said first plane as a consequence of engagement of said needle with the grooves of a phonograph record imparts corresponding vibratory movement to said diaphram thereby audibly reproducing the message recorded on the phonograph;

h. indexing mechanism operated in response to actuation of said advancing mechanism through said advance cycle and engaging said tone-arm for intermittently moving said needle in said second plane to successive positions corresponding to the starting grooves of respective messages on said record;

i. camming means operated in response to actuation of said advancing mechanism and engaging said first arm for camming said tone-arm in said first plane thereby to separate said needle from a phonograph record at the beginning of movement of said advancing mechanism through said advance cycle and for establishing engagement between said needle and the starting groove of a successive message at the completion of movement of said advancing mechanism through said advance cycle; and j. first and second spring means respectively connected with said first arm on opposite sides of said fulcrum means, said first and second spring means cooperating to maintain said tone-arm in pivoting engagement with said fulcrum means, the one of said first and second spring means nearer the distal end of said first arm being stronger than the other of said spring means thereby acting to maintain the needle in engagement with a phonograph record.

* * * * *